United States Patent
Yu et al.

(10) Patent No.: US 10,013,802 B2
(45) Date of Patent: Jul. 3, 2018

(54) VIRTUAL FITTING SYSTEM AND VIRTUAL FITTING METHOD

(71) Applicants: BOE TECHNOLOGY GROUP CO., LTD., Beijing (CN); BEIJING BOE MULTIMEDIA TECHNOLOGY CO., LTD., Beijing (CN)

(72) Inventors: Shuhuan Yu, Beijing (CN); Peng Cheng, Beijing (CN); Junning Su, Beijing (CN); Jianzi He, Beijing (CN); Chao Zhang, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 88 days.

(21) Appl. No.: 15/142,747

(22) Filed: Apr. 29, 2016

(65) Prior Publication Data
US 2017/0091995 A1    Mar. 30, 2017

(30) Foreign Application Priority Data
Sep. 28, 2015 (CN) .......................... 2015 1 0629738

(51) Int. Cl.
G06F 3/041 (2006.01)
G06T 17/20 (2006.01)

(52) U.S. Cl.
CPC ............ *G06T 17/20* (2013.01); *G06F 3/0416* (2013.01); *G06T 2210/16* (2013.01)

(58) Field of Classification Search
None
See application file for complete search history.

(56) References Cited

U.S. PATENT DOCUMENTS

2012/0326995 A1   12/2012   Zhang et al.
2013/0278760 A1*  10/2013   Beams ................... H04N 7/18
                                               348/143
(Continued)

FOREIGN PATENT DOCUMENTS

CN      102609871 A    7/2012
CN      102841733 A    12/2012
(Continued)

OTHER PUBLICATIONS

Infrared from SensorWiki.org, downloaded @ http://www.sensorwiki.org/doku.php/sensors/infrared, available since Jan. 25, 2009 by Joe.*

(Continued)

*Primary Examiner* — Yingchun He
(74) *Attorney, Agent, or Firm* — Ladas & Parry LLP

(57) ABSTRACT

A virtual fitting system includes: a somatosensory unit configured to obtain first operation information associated with a user through detecting a movement associated with the user; a touching unit configured to obtain second operation information associated with the user through detecting a touching signal associated with the user; a distance detecting unit configured to obtain a distance between the user and the display screen; a processing unit configured to input display information to the display screen according to the first operation information when the distance falls into a first preset range and to input display information to the display screen according to the second operation information when the distance falls into a second preset range; and a display screen configured to display according to the display information inputted by the processing unit. Also, a virtual fitting method is provided.

10 Claims, 5 Drawing Sheets

(56) References Cited

U.S. PATENT DOCUMENTS

2014/0354695 A1  12/2014  Sakai
2014/0368456 A1* 12/2014  Sakai .................... G06F 3/0488
                                                        345/173

FOREIGN PATENT DOCUMENTS

CN    103838496 A    6/2014
CN    104040463 A    9/2014
JP    2013-008249 A  1/2013

OTHER PUBLICATIONS

The First Chinese Office Action dated Aug. 18, 2017; Appln. No. 201510629738.9.
The Second Chinese Office Action dated Dec. 4, 2017; Appln. No. 201510629738.9.

* cited by examiner

VIRTUAL FITTING SYSTEM AND VIRTUAL FITTING METHOD

TECHNICAL FIELD

Embodiments of the disclosure relates to a virtual fitting system and a virtual fitting method.

BACKGROUND

A user may use a virtual fitting mirror to virtually try on different clothes. For example, when a user is standing in front of a virtual fitting mirror, three-dimensional images of the user wearing different fitting clothes can be shown in the virtual fitting mirror.

SUMMARY

According to one novel aspect of this disclosure, a virtual fitting system is provided, which includes a somatosensory unit, a touching unit, a distance detecting unit, a processing unit and a display screen. The somatosensory unit is configured to obtain first operation information associated with a user through detecting a body movement of the user. The touching unit is configured to obtain second operation information associated with the user through detecting a touching signal associated with the user. The distance detecting unit is configured to obtain a distance between the user and the display screen. The processing unit is configured to input display information to the display screen according to the first operation information when the distance falls into a first preset range and to input display information to the display screen according to the second operation information when the distance falls into a second preset range. The display screen is configured to display according to the display information inputted by the processing unit.

According to another aspect of this disclosure, a virtual fitting method is provided, which includes: obtaining a distance between a user and a display screen; inputting display information to the display screen according to the distance. Inputting display information to the display screen according to the distance includes: when the distance falls into a first preset range, inputting the display information to the display screen according to first operation information associated with the user; and when the distance falls into a second preset range, inputting the display information to the display screen according to second operation information associated with the user. The first operation information is obtained by detecting a body movement associated with the user through a somatosensory unit, and the second operation information is obtained by detecting a touching signal associated with the user through a touching unit.

BRIEF DESCRIPTION OF THE DRAWINGS

The present disclosure will become more fully understood from the detailed description given hereinafter and the accompanying drawings used when describing the embodiments or prior art, which are given by way of illustration only, and thus are not limitative of the present disclosure. Those skilled in the art can obtain other drawings according to the drawings shown herein without inventive labors. Wherein.

DETAIL DESCRIPTION

Thereafter will describe the solutions according to the embodiments of the present disclosure clearly and fully in connection with the drawings in the embodiments of the present disclosure. Obviously, the embodiments described are only a part of embodiments of the present disclosure instead of all of the embodiments. All of other embodiments educing from the embodiments of the present disclosure by those ordinary skilled in the art without any inventive labors are fallen into the scope of the present disclosure.

A present virtual fitting mirror is mainly based on somatosensory technology. Through the somatosensory technology, when a user is viewing the fitting result in a relative long distance, the user may operate and control the virtual fitting mirror remotely at the same time. With the development of the virtual fitting mirror, more and more clothes materials are available. When a user searches a clothes material and needs to search a clothes type accurately due to a lot of clothes properties, the user needs to operate and control the display in a touch mode in a short distance to the display screen in order to look for his/her favorite clothes. In the whole fitting process, the user needs to manually switch the virtual fitting mirror between a long distance operating mode and a short distance operating mode, which is not convenient for the user, thereby decreasing the user experience.

Figure 1:
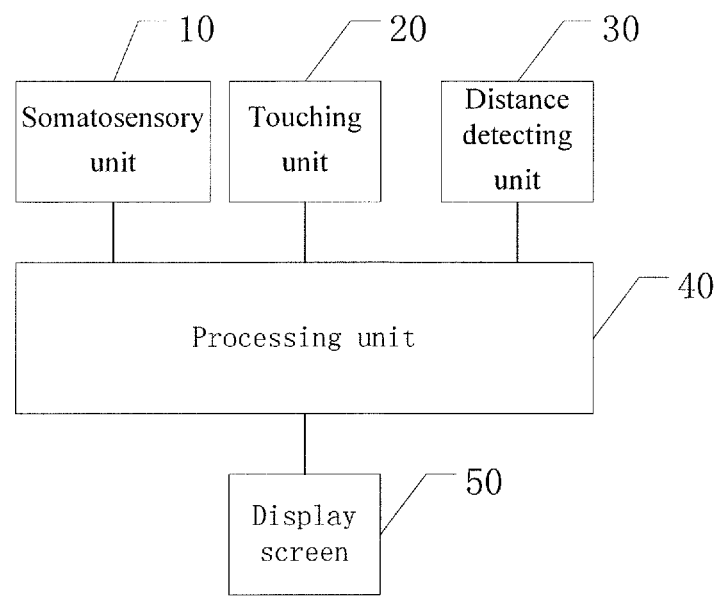
FIG. 1 is an exemplary view of a virtual fitting system provided in embodiments of this disclosure.
Figure 2A:
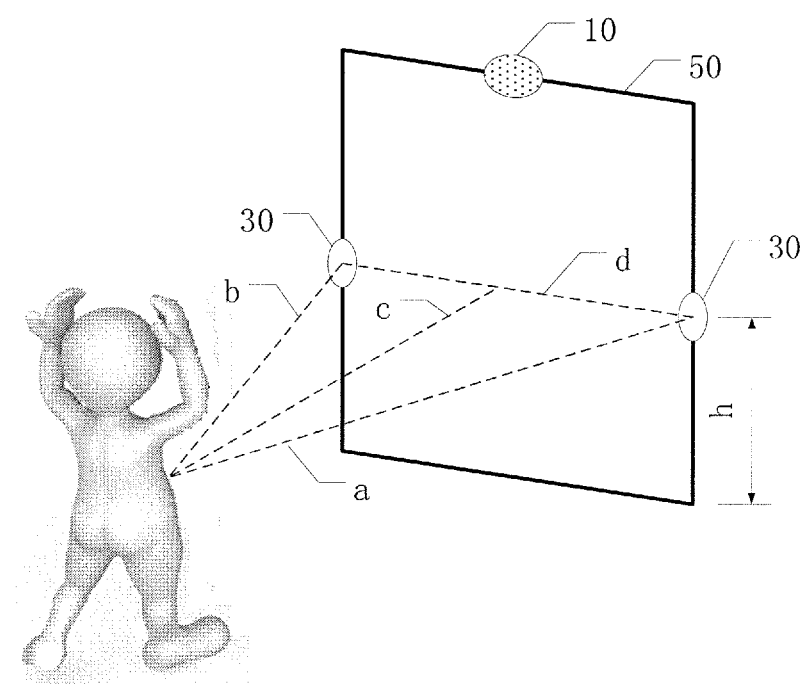
FIG. 2a is an exemplary view showing positions of respective components in a virtual fitting system provided in embodiments of this disclosure.
Figure 2B:
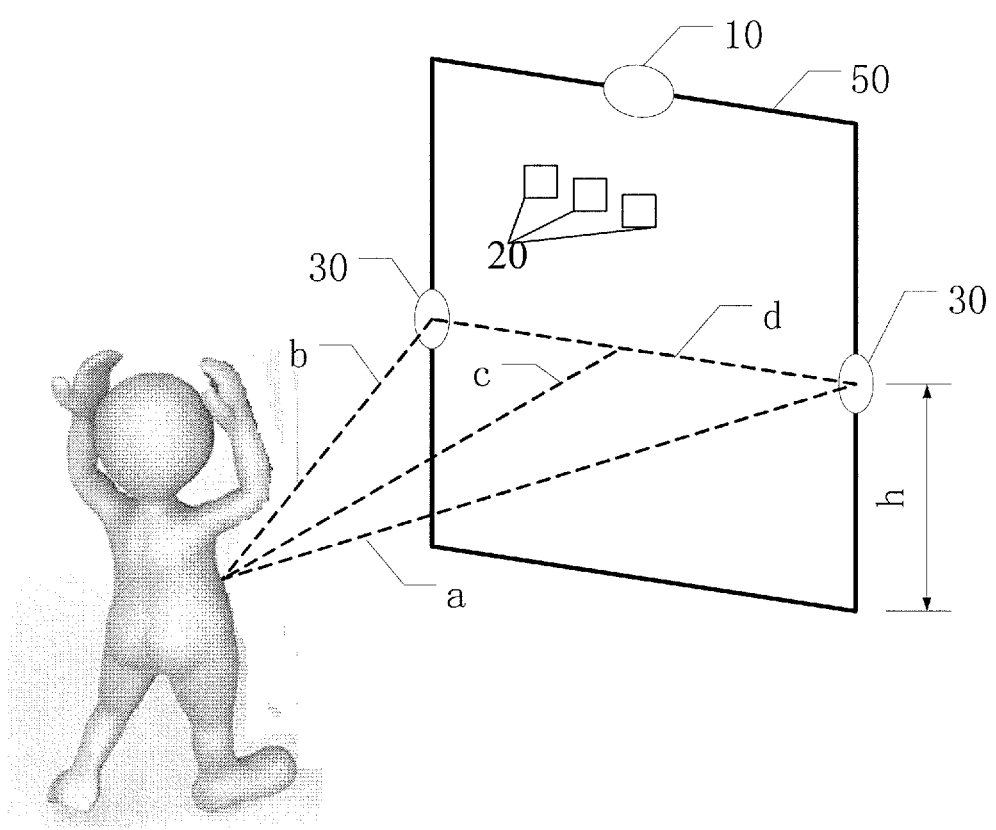
FIG. 2b is another exemplary view showing positions of respective components in a virtual fitting system provided in embodiments of this disclosure.

FIG. 1 is an exemplary view of a virtual fitting system provided in embodiments of this disclosure. FIGS. 2a and 2b are exemplary views illustrating positions of respective components in the virtual fitting system provided in embodiments of this disclosure. Referring to FIG. 1, FIG. 2a and FIG. 2b, the virtual fitting system may include a somatosensory unit 10, a touching unit 20, a distance detecting unit 30, a processing unit 40 and a display screen 50.

The somatosensory unit 10 is configured to obtain first operation information associated with the user through detecting the user's body movements. For example, the first operation information of the user can be obtained through obtaining a movement image, a movement intensity or direction and so on.

The somatosensory unit 10 may include a somatosensory interacting controller (for example, a joystick, a helmet or an acceleration sensor placed on one or some places of the human body, etc.) to obtain the user's movement information. In addition, the somatosensory unit 10 may also include a camera used to capture images of the user's movements, thereby obtaining the user's movement information from multi-aspects.

The touching unit 20 is configured to obtain second operation information of the user through detecting a touching signal of the user. The touching unit 20 for example may be a touch part of the display screen 50. For instance, the touching unit 20 can include a capacitive touch apparatus, a resistance touch apparatus or a pressure touch apparatus and so on.

The distance detecting unit 30 is configured to obtain a distance between the user and the display screen. For example, the distance detecting unit may be an infrared distance measuring sensor.

The processing unit 40 is configured to input display information to the display screen according to the first operation information when the distance falls into a first preset range and to input display information to the display screen according to the second operation information when the distance falls into a second preset range. The processing unit 40 may be implemented through software, a microprocessor chip, a micro-controller or combination of software and hardware. For example, the processing unit 40 may include a central processing unit, a special processing chip, etc.

The display screen 50 is configured to display according to the display information input from the processing unit.

The virtual fitting system provided in embodiments of this disclosure is capable of detecting the distance between the user and the display screen in real time through the distance detecting unit. And then the processing unit determines a current operation mode according to the distance. When the distance falls into the first preset range, the processing unit inputs display information to the display screen according to the first operation information detected by the somatosensory unit to implement a long distance operation mode. When the distance falls into the second preset range, the processing unit inputs display information to the display screen according to the second operation information detected by the touching unit to implement a short distance operation mode. Thus, an automatic switching between the long distance operation mode and the short distance operation mode can be achieved. Accordingly, the user experience is improved.

In embodiments of this disclosure, the processing unit can automatically select effective operation information from the first operation information and the second operation information according to the distance between the user and the display screen. When the distance falls into the first preset range, the first operation information detected by the somatosensory unit is selected as effective operation information. When the distance falls into the second preset range, the second operation information detected by the touching unit is selected as effective operation information. And then the processing unit processes the selected effective operation information. For example, the processing unit can generate corresponding display data to be displayed on the display screen to show the user of the switching of the operation modes.

For example, when the distance falls into the first preset range, the processing unit controls the somatosensory unit to be turned on and the touching unit to be turned off; when the distance falls into the second preset range, the processing unit controls the somatosensory unit to be turned off and the touching unit to be turned on. Thus, the system energy consumption is reduced. Alternatively, when the distance falls into the second preset range, the processing unit may control the somatosensory unit and the touching unit to be in a turn-on state at the same time, and therefore it is convenient for the user to select input modes when she/he desires.

According to an example of this disclosure, in order to improve accuracy of the measured distance, multiple distance detecting units may be provided. For example, as shown in FIG. 2a, two distance detecting units 30 are configured respectively on the two sides of the display screen 50. The distances a and b from the two distance detecting units 30 to the user are measured respectively by the two distance detecting units 30. By combing a width d of the display screen and the two distances a and b, the distance c between the user and the display screen can be determined. For example, the distance h between the distance detecting unit 30 and the ground can be around 1 meter. When the somatosensory unit 10 includes a camera, the somatosensory unit 10 can be installed on the right top of the display screen. When the somatosensory unit 10 includes a sensing control apparatus such as a joystick, a helmet or an acceleration sensor, the somatosensory unit 10 can also be worn on the body of the user.

Figure 3:
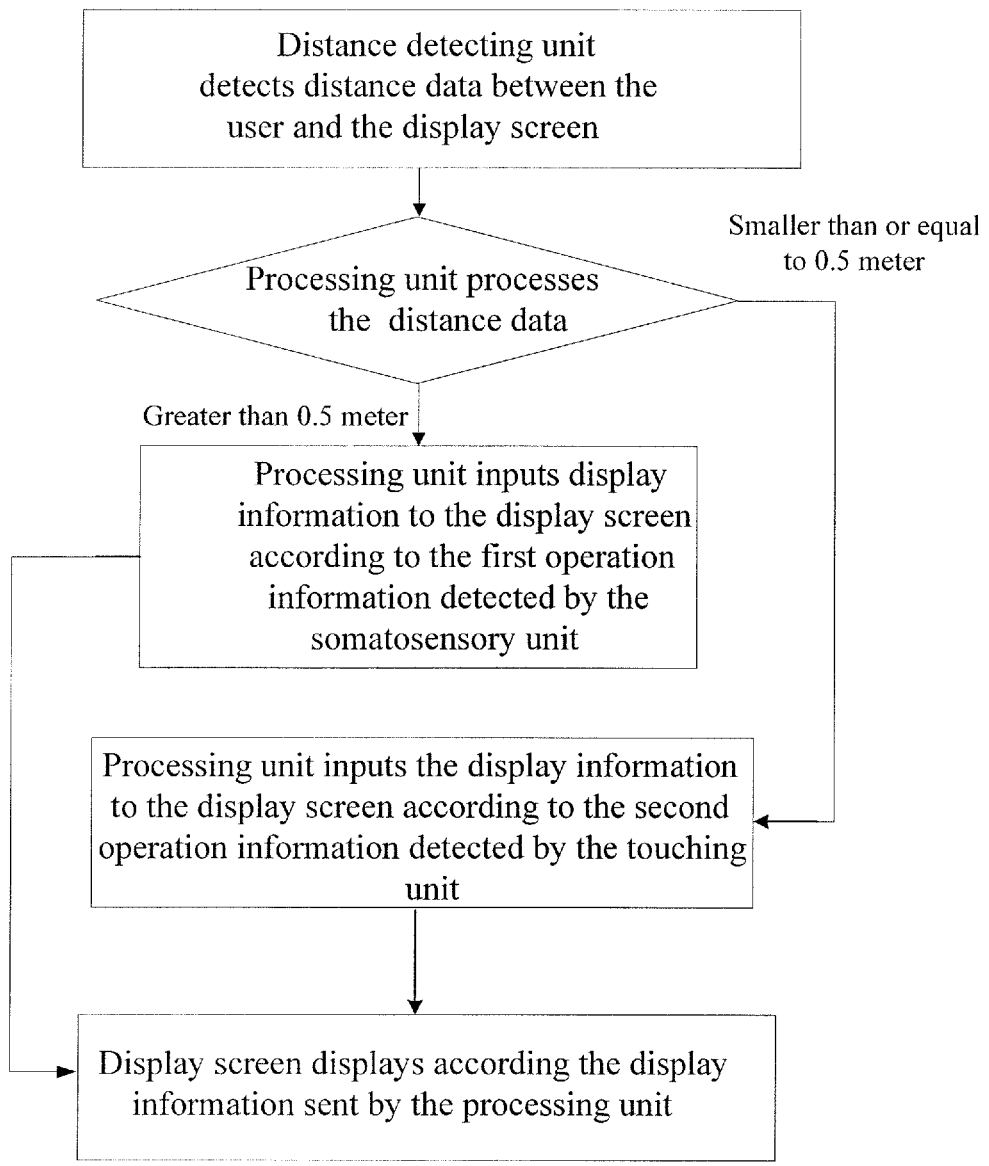
FIG. 3 is an operation flow chart of a virtual fitting system provided in embodiments of this disclosure.

When the processing unit determines the current operation mode, the processing unit may compare the distance measured by the distance detecting unit with a preset value. When the measured distance is less than or equal to the preset value, the current operation mode is determined to be the short distance operation mode, and in this mode only the touching unit operates or both the touching unit and the somatosensory unit may operate simultaneously. When the measured distance is larger than the preset value, the current operation mode is determined to be the long distance operation mode, and in this mode the somatosensory unit operates. For example, the preset value may be 0.5 meter. As shown in FIG. 3, the distance detecting unit detects the distance data between the user and the display screen in real time, and sends the distance data to the processing unit. Then the processing unit processes the received distance data. When the distance is larger than 0.5 meter, the current operation mode is determined to be the long distance operation mode; in this case, the processing unit inputs display information to the display screen according to the first operation information detected by the somatosensory unit. When the distance is smaller than or equal to 0.5 meter, the current operation mode is determined to be the short distance operation mode; in this case, the processing unit inputs the display information to the display screen according to the second operation information detected by the touching unit. In either case, the display screen displays according the display information sent by the processing unit. In an example of this disclosure, the display information shown in the display screen in the short distance operation mode and the display information shown in the display screen in the long distance operation mode are the same. In another example of this disclosure, the display information shown in the display screen in the short distance operation mode and the display information shown in the display screen in the long distance operation mode are different.

Figure 4:
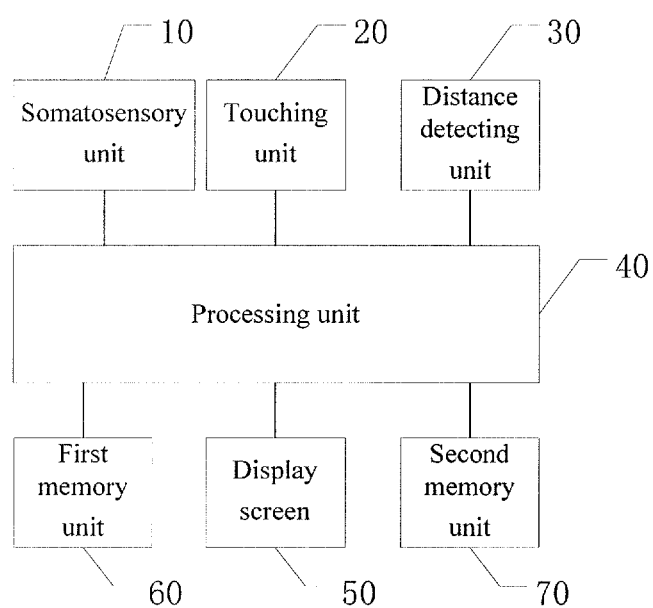
FIG. 4 is an exemplary view of another virtual fitting system in embodiments of this disclosure.

As illustrated in FIG. 4, FIG. 4 is an exemplary view of another virtual fitting system provided in embodiments of this disclosure. The virtual fitting system includes a somatosensory unit 10, a touching unit 20, a distance detecting unit 30, a processing unit 40, a display screen 50, a first memory unit 60 and a second memory unit 70. In this embodiment, the somatosensory unit 10, the touching unit 20, the distance detecting unit 30, the processing unit 40 and the display screen 50 are similar to the respective elements in FIG. 1, and thus only a brief description of the similar elements is provided in the following.

The somatosensory unit 10 is configured to obtain the first operation information of the user through detecting the body image of the user. For example, through the somatosensory unit, the user's body figure can be sensed and the user's body movement can be detected.

The touching unit 20 is configured to obtain the second operation information of the user through detecting the user's touching signal.

The distance detecting unit 30 is configured to obtain the distance between the user and the display screen; for example, the distance detecting unit can be an infrared distance measurement sensor.

The processing unit 40 is configured to input the display information to the display screen according to the first operation information when the distance is in a first preset range and to input the display information to the display screen according to the second operation information when the distance is in a second preset range. Besides, the processing unit 40 can also be used to process the data from each unit and the operation sequence in the virtual fitting system.

The display screen 50 is configured to display information according to the display information inputted by the processing unit.

The first memory unit 60 is configured to store the three dimensional model data of the clothes to be tried on.

The second memory unit 70 is configured to store video image data. When the distance is in a third preset range, the processing unit inputs the video image data stored in the second memory unit to the display screen to display.

For example, in the virtual fitting system described above, the touching unit 20 can be combined with the display screen 50; in other words, a display apparatus with a touch function can be used directly.

In the virtual fitting system provided in the embodiment, the processing unit determines the current operation mode according to the distance between the current user and the display screen. When the measured distance is in the first preset range, the current mode is determined to be the long distance operation mode; in this case, the user uses the somatosensory unit to operate, such as to switch clothes or to view the fitting result dynamically. When the measured distance is in the second preset range, the current mode is determined to be the short distance operation mode; in this case, the user uses the touching unit to operate (e.g., to implement operations) in a short distance, such as to operate on the main operation system of the virtual fitting system and to accurately search for a clothes. For example, the user may search for a desired type of clothes from the first memory unit. When the measured distance is in the third preset range, the system exits the fitting mode; in this case, the processing unit can input the video data stored in the second memory unit to the display screen to display. For example, an advertisement video or other video data can be displayed.

In this embodiment, when the measured distance is in the third preset range, the system exits the fitting mode. In order to reduce the system energy assumption, both the touching unit and the somatosensory unit can be maintained in a turn-off state. When a user is detected to enter into a working range of the virtual fitting system (that is, the measured distance is in the first preset range or the second preset range), the system stops the playing of the video image data from the second memory unit and turns into the fitting mode.

In this embodiment, the first preset range may be greater than a first preset value and less than a second preset value. The second preset range may be less than or equal to the first preset value, and the third preset range may be greater than the second preset value. For example, the first preset value may be 0.5 meter, and the second preset value may be 5 meters.

Besides, when the distance detecting unit detects that the distance between the user and the display screen is the first preset value described above, the somatosensory unit can also be used to determine whether the user is moving forward (e.g., moving towards the display screen) or moving backward (e.g., moving away from the display screen). If the user is moving forward, the somatosensory unit may be turned off, and the touching unit may be turned on. If the user is moving backward, the somatosensory unit may continue to work and the touching unit may be turned off.

In the virtual fitting system provided in the embodiments of this disclosure, the distance detecting unit is used to detect the distance between the user and the display screen in real time, and the processing unit determines the current operation mode according to the distance. When the distance is in the first preset range, the processing unit inputs display information to the display screen according to the first operation information detected by the somatosensory unit to implement the long distance operation mode. And when the distance is in the second preset range, the processing unit inputs display information to the display screen according to the second operation information detected by the touching unit to implement the short distance operation mode. Therefore, an automatic switching between the long distance mode and the short distance mode can be achieved and the user experience is improved.

In addition, a virtual fitting method is provided in the embodiments of this disclosure. The virtual fitting method is corresponding to the above-mentioned virtual fitting system. For the conciseness of the specification, it will be only described briefly in the following.

Figure 5:
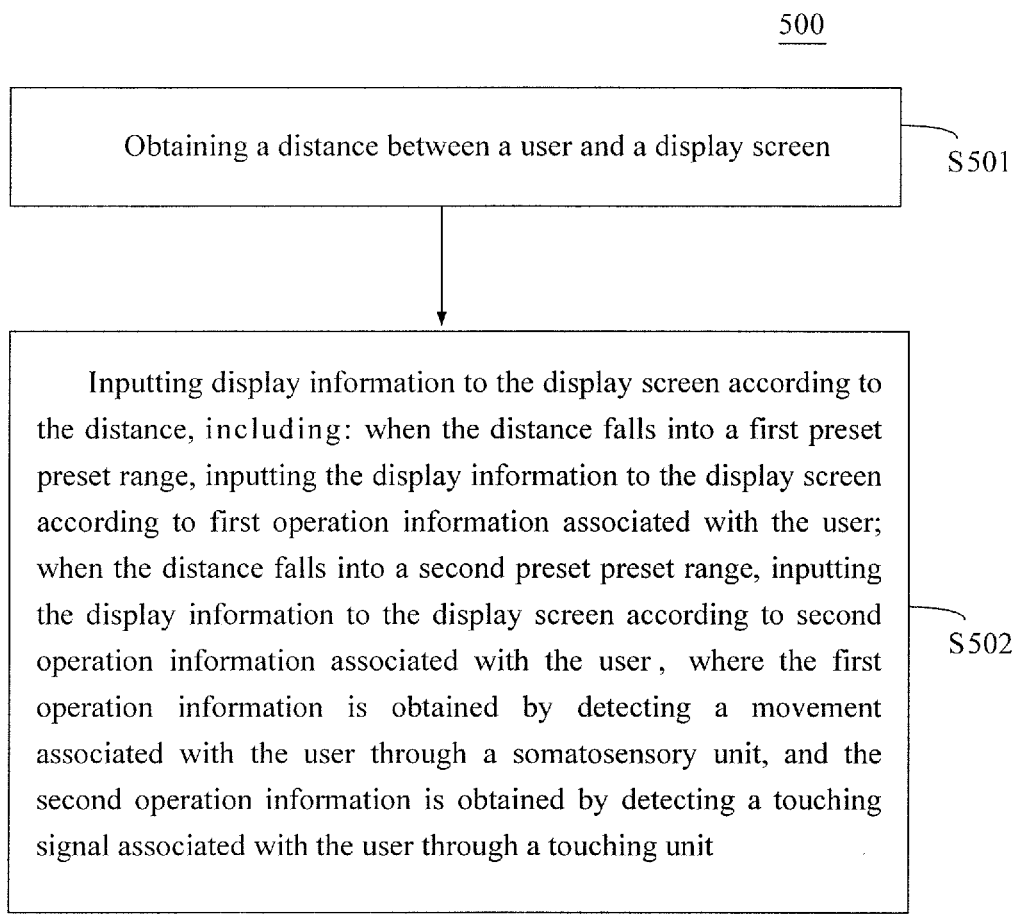
FIG. 5 is a flow chart of a virtual fitting method provided in embodiments of this disclosure.

FIG. 5 is a flow chart of the virtual fitting method provided in the embodiments of the disclosure. As shown in FIG. 5, the step S501 of the virtual fitting method 500 includes determining a distance between a user and a display screen.

The step S502 includes inputting display information to the display screen according to the distance. For example, when the distance falls into a first preset range, the step S502 includes inputting display information to the display screen according to first operation information of the user; when the distance falls into a second preset range, the step S502 includes inputting display information to the display screen according to second operation information of the user. The first operation information is obtained through detecting the user's body movement by the somatosensory unit, and the second operation information is obtained through detecting the user's touching signal by the touching unit.

For example, the step of inputting the display information to the display screen according the distance includes: when the distance falls into the first preset range, controlling the somatosensory unit to be turned on and the touching unit to be turned off; when the distance falls into the second preset range, controlling the somatosensory unit to be turned off and the touching unit to be turned on.

For example, when the distance falls into a third preset range, a pre-stored video image data may be input to the display screen to display.

For example, the first preset range is greater than a first preset value and less than a second preset value, the second preset range is less than or equal to the first preset value, and the third preset range is greater than the second preset value.

The virtual fitting method provided in embodiments of the disclosure obtains the distance between the user and the display screen and determines the current operation mode according to distance, thereby achieving automatic switching between a long distance operation mode and a short distance operation mode. Thus, the user experience is improved.

The application claims priority to the Chinese patent application No. 201510629738.9, filed on Sep. 28, 2015, the disclosure of which is incorporated herein in its entirety by reference as part of the application.

What is claimed is:

1. A virtual fitting system, comprising a somatosensory unit, a touching unit, a distance detecting unit, a processing unit and a display screen; wherein:
   the somatosensory unit is configured to obtain first operation information associated with a user through detecting a movement associated with the user;
   the touching unit is configured to obtain second operation information associated with the user through detecting a touching signal associated with the user;
   the distance detecting unit is configured to obtain a distance between the user and the display screen;
   the processing unit is configured to input display information to the display screen according to the first operation information when the distance falls into a first preset range and to input display information to the display screen according to the second operation information when the distance falls into a second preset range; and
   the display screen is configured to display according to the display information inputted by the processing unit;
   wherein, when the distance detecting unit detects that the distance between the user and the display screen is the first preset value described above, the somatosensory unit is used to determine whether the user is moving towards the display screen or moving away from the display screen, if the user is moving towards the display screen, the somatosensory unit is turned off, and the touching unit is turned on.

2. The virtual fitting system according to claim 1, wherein:
   when the distance falls into the second preset range, the processing unit controls the somatosensory unit to be turned off and the touching unit to be turned on.

3. The virtual fitting system according to claim 1, further comprising a first memory unit configured to store 3-dimensional model data of clothes to be tried on.

4. The virtual fitting system according to claim 1, further comprising a second memory unit configured to store video image data,
   wherein when the distance falls into a third preset range, the processing unit inputs the video image data stored in the second memory unit to the display screen to display.

5. The virtual fitting system according to claim 4, wherein the first preset range is greater than a first preset value and less than a second preset value, the second preset range is less than or equal to the first preset value, and the third preset range is greater than the second preset value.

6. The virtual fitting system according to claim 1, wherein the distance detecting unit includes an infrared distance measurement sensor.

7. A virtual fitting method, comprising:
   obtaining a distance between a user and a display screen; and
   inputting display information to the display screen according to the distance,
   wherein inputting display information to the display screen according to the distance comprises:
     when the distance falls into a first preset range, inputting the display information to the display screen according to first operation information associated with the user; and
     when the distance falls into a second preset range, inputting the display information to the display screen according to second operation information associated with the user;
   wherein the first operation information is obtained by detecting a movement associated with the user through a somatosensory unit, and the second operation information is obtained by detecting a touching signal associated with the user through a touching unit;
   wherein, when the distance detecting unit detects that the distance between the user and the display screen is the first preset value described above, the somatosensory unit is used to determine whether the user is moving towards the display screen or moving away from the display screen, if the user is moving towards the display screen, the somatosensory unit is turned off, and the touching unit is turned on.

8. The virtual fitting method according to claim 7, wherein inputting the display information to the display screen according to the distance includes:
   when the distance falls into a second preset range, controlling the somatosensory unit to be turned off and the touching unit to be turned on.

9. The virtual fitting method according to claim 7, wherein when the distance falls into a third preset range, pre-stored video image data is input to the display screen to display.

10. The virtual fitting method according to claim 9, wherein the first preset range is greater than a first preset value and less than a second preset value, the second preset range is less than or equal to the first preset value, and the third preset range is greater than the second preset value.

* * * * *